United States Patent
Devta

(10) Patent No.: US 11,381,638 B1
(45) Date of Patent: Jul. 5, 2022

(54) SYSTEM AND METHOD FOR PARALLEL EXECUTION OF ACTIVITES IN AN INTEGRATION FLOW

(71) Applicant: ORACLE INTERNATIONAL CORPORATION, Redwood Shores, CA (US)

(72) Inventor: Prakash Kumar Devta, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/180,483

(22) Filed: Feb. 19, 2021

(51) Int. Cl.
*G06F 15/16* (2006.01)
*H04L 67/10* (2022.01)

(52) U.S. Cl.
CPC .................................. *H04L 67/10* (2013.01)

(58) Field of Classification Search
CPC ........................................................ H04L 67/10
See application file for complete search history.

(56) References Cited

U.S. PATENT DOCUMENTS

| | | |
|---|---|---|
| 10,585,678 B2 | 3/2020 | Devta |
| 11,178,252 B1 | 11/2021 | Devta |
| 2019/0324763 A1* | 10/2019 | Devta .................... G06F 9/451 |
| 2021/0203714 A1 | 7/2021 | Devta |
| 2021/0373915 A1 | 12/2021 | Devta |
| 2022/0038367 A1 | 2/2022 | Devta |

* cited by examiner

*Primary Examiner* — Wing F Chan
*Assistant Examiner* — Joseph R Maniwang
(74) *Attorney, Agent, or Firm* — Tucker Ellis LLP

(57) ABSTRACT

Systems and methods for parallel execution of activities in an integration flow. Systems and methods are provided for determining one or more points within an integration orchestration where downstream activities can be executed in parallel and/or asynchronously with the main flow of the integration orchestration.

20 Claims, 8 Drawing Sheets

SYSTEM AND METHOD FOR PARALLEL EXECUTION OF ACTIVITES IN AN INTEGRATION FLOW

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to U.S. Pat. No. 10,585,678, entitled "INSERTION OF CUSTOM ACTIVITIES IN AN ORCHESTRATED APPLICATION SUITE", issued on Mar. 10, 2020, which is incorporated herein by reference in its entirety.

FIELD OF INVENTION

Embodiments of the invention are generally related to integration cloud services, and in particular, systems and methods for parallel execution of activities in an integration flow.

BACKGROUND

Integration cloud services (ICS) (e.g., Oracle Integration Cloud Service) are simple and powerful integration platforms in the cloud that assist in the utilization of products, such as Software as a Service (SaaS) and on-premises applications. ICS can be provided as an integration platform as a service (iPaas) and can include a web-based integration designer for point and click integration between applications, a rich monitoring dashboard that provides real-time insight into the transactions.

SUMMARY

In accordance with an embodiment, systems and methods for parallel execution of activities in an integration flow. An exemplary method can provide a computer including one or more microprocessors, and can provide an integration platform running on the computer. The method can provide an integration orchestration at the integration platform, the integration orchestration having associated therewith a plurality of connectors, each connector connecting to at least one other of the plurality of connectors. The method can determine a point of parallel execution for one or more of the plurality of connectors. The method can insert an instruction into the integration orchestration. The method can, upon execution of the integration orchestration, upon reaching the inserted instruction, execute the one or more of the plurality of connectors asynchronously from the remainder of the integration orchestration.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

Integration platform as a Service, for example, Oracle Integration Cloud Service (ICS), can provide a cloud-based platform for building and deploying integrations flows that connect applications residing in the cloud or on-premises.

Integration Cloud Service

Figure 1:
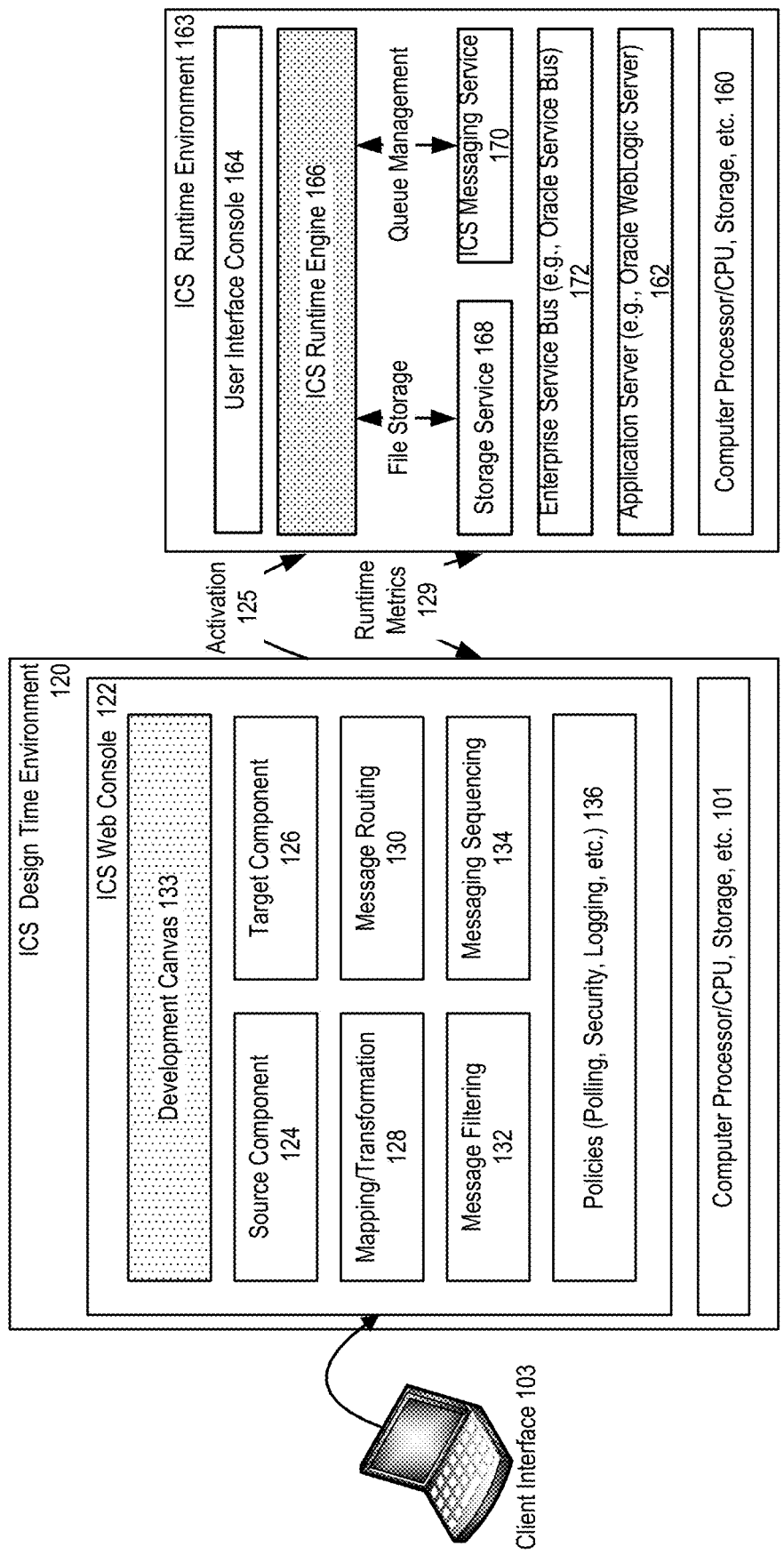
FIG. 1 illustrates an integration cloud service in accordance with an embodiment.

FIG. 1 illustrates an ICS platform for designing and executing an ICS integration flow, in according with an embodiment.

As shown in FIG. 1, the ICS platform can include a design-time environment 120, and a runtime environment 163. Each environment can execute on a computer including one or more processors, for example a computer 101 or 106.

In accordance with an embodiment, the design-time environment includes an ICS web console 122, which provides a browser-based designer to allow an integration flow developer to build integrations using a client interface 103.

In accordance with an embodiment, the ICS design-time environment can be pre-loaded with connections to various SaaS applications or other applications, and can include a source component 124, and a target component 126. The source component can provide definitions and configurations for one or more source applications/objects; and the target component can provide definitions and configurations for one or more target applications/objects. The definitions and configurations can be used to identify application types, endpoints, integration objects and other details of an application/object.

As further shown in FIG. 1, the design-time environment can include a mapping/transformation component 128 for mapping content of an incoming message to an outgoing message, and a message routing component 130 for controlling which messages are routed to which targets based on content or header information of the messages. Additionally, the design-time environment can include a message filtering component 132, for controlling which messages are to be routed based on message content or header information of the messages; and a message sequencing component 134, for rearranging a stream of related but out-of-sequence messages back into a user-specified order.

In accordance with an embodiment, each of the above of the described components, as with the source and target components, can include design-time settings that can be persisted as part of a flow definition/configuration.

In accordance with an embodiment, a flow definition specifies the details of an ICS integration flow; and encompasses both the static constructs of the integration flow (for example, message routers), and the configurable aspects (for example, routing rules). A fully configured flow definition and other required artifacts (for example, jca and .wsdl files) in combination can be referred to as an ICS project. An ICS project can fully define an integration flow, and can be implemented by an underlying implementation layer.

In accordance with an embodiment, a policies component 136 can include a plurality of policies that govern behaviors of the ICS environment. For example, a polling policy can be configured for source-pull messaging interactions (i.e. query style integrations) for a source application, to invoke an outbound call to the source application via a time-based polling.

In accordance with an embodiment, other policies can be specified for security privileges in routing messages to a target application; for logging message payloads and header fields during a flow execution for subsequent analysis via a monitoring console; and for message throttling used to define a number of instances that an enterprise service bus (ESB) service can spawn to accommodate requests. In addition, policies can be specified for monitoring/tracking an integration flow at a flow level; and for validating messages being processed by the ICS platform against a known schema.

In accordance with an embodiment, an integration developer can drag and drop a component on a development canvas 133 for editing and configuration, for use in designing an integration flow.

As further shown, the runtime environment can include an application server 162, an ICS runtime engine 166, a storage service 168 and a messaging service 170 on top of an enterprise service bus component 172. A user interface console 164 can be used to monitor and track performance of the runtime environment.

Figure 2:
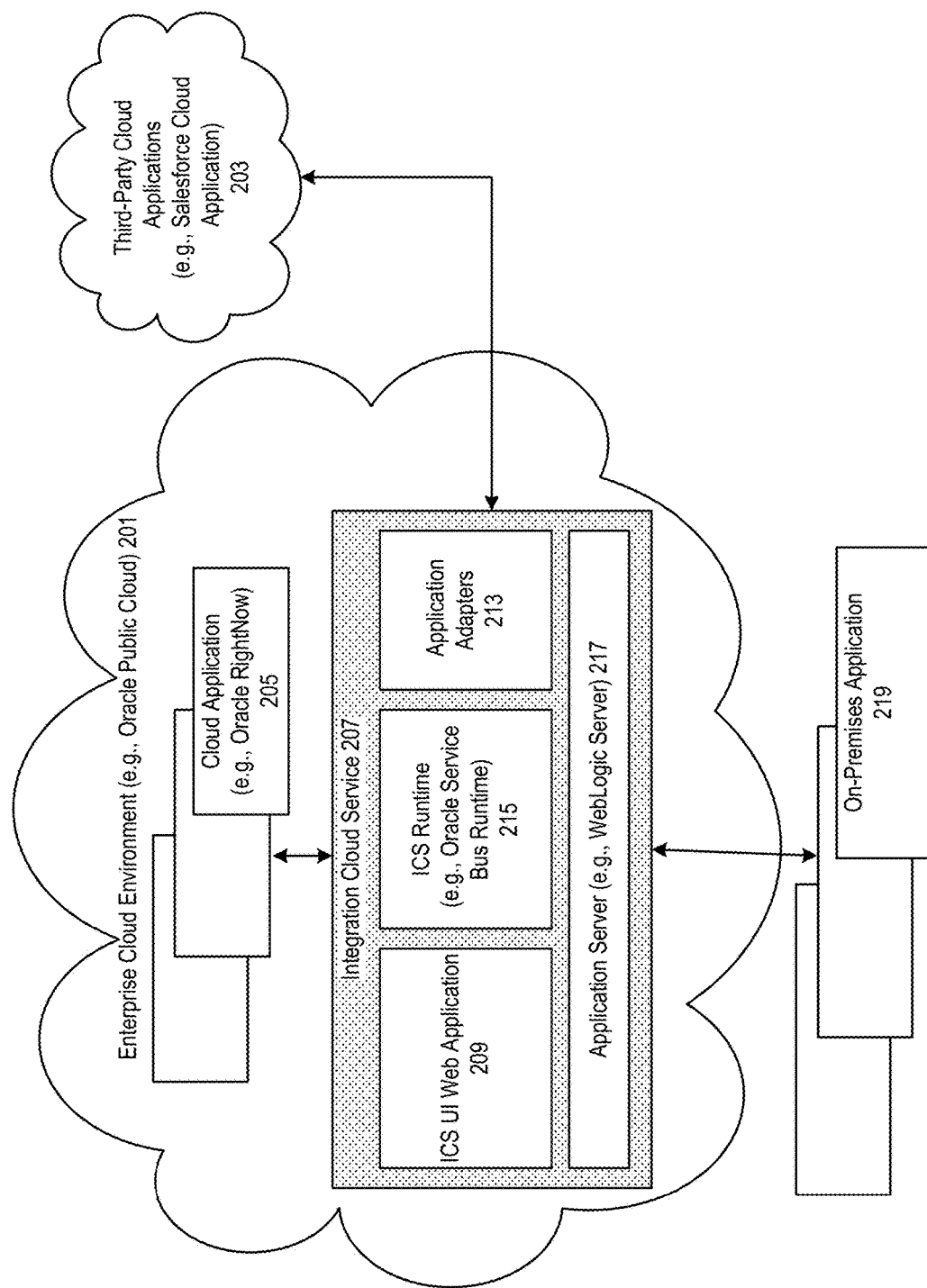
FIG. 2 illustrates an integration cloud service in accordance with an embodiment.

FIG. 2 illustrates an integration cloud service in accordance with an embodiment.

As shown in FIG. 2, an ICS 207 can provide a cloud-based integration service for designing, executing, and managing ICS integration flows. The ICS can include a web application 209 and an ICS runtime 215 executing on an application server 217 in an enterprise cloud environment (for example, Oracle Public Cloud) 201. The web application can provide a design time that exposes a plurality of user interfaces for a user to design, activate, manage, and monitor an ICS integration flow. An activated ICS integration flow can be deployed and executed on the ICS runtime.

In accordance with an embodiment, a plurality of application adapters 213 can be provided to simplify the task of configuring connections to a plurality of applications, by handling the underlying complexities of connecting to those applications. The applications can include enterprise cloud applications of the ICS vendor 205, third-party cloud applications (for example, Salesforce) 103, and on-premises applications 219. The ICS can expose simple object access protocol (SOAP) and representational state transfer (REST) endpoints to these applications for use in communicating with these applications.

In accordance with an embodiment, an ICS integration flow (or ICS integration) can include a source connection, a target connection, and field mappings between the two connections. Each connection can be based on an application adapter, and can include additional information required by the application adapter to communicate with a specific instance of an application.

In accordance with an embodiment, an ICS integration flow and a plurality of other required artifacts (for example, JCA and WSDL files) can be compiled into an ICS project, which can be deployed and executed in the ICS runtime. A plurality of different types of integration flow patterns can be created using the web UI application, including data mapping integration flows, publishing integration flows, and subscribing integration flows. To create a data mapping integration flow, an ICS user can use an application adapter or an application connection to define a source application and a target application in the development interface, and define routing paths and data mappings between the source and target application. In a publishing integration flow, a source application or a service can be configured to publish messages to the ICS through a predefined messaging service. In a subscribing integration flow, a target application or service can be configured to subscribe to messages from the ICS through the messaging service.

Figure 3:
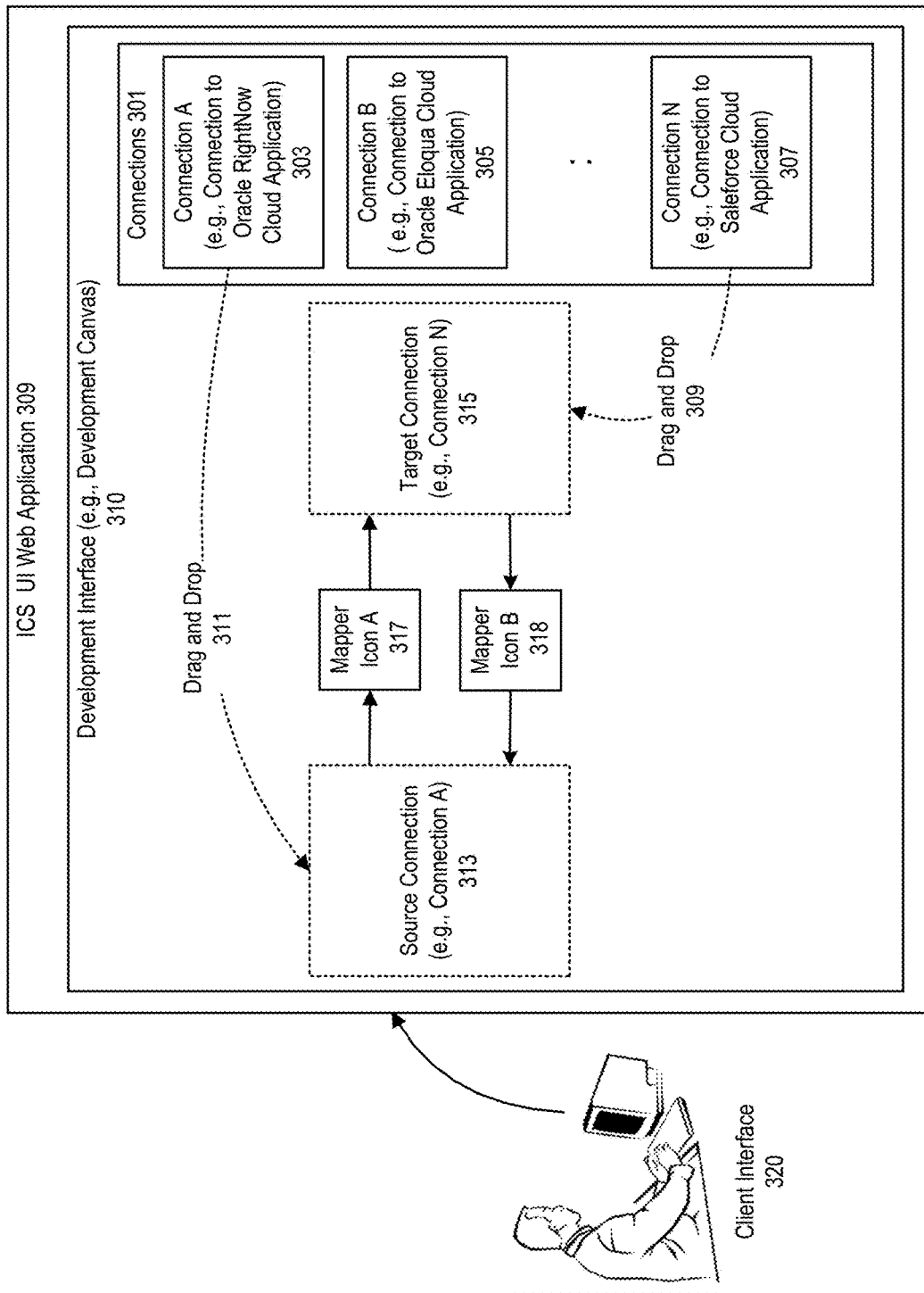
FIG. 3 illustrates an ICS design time, in accordance with an embodiment.

FIG. 3 illustrates an ICS design time, in accordance with an embodiment.

In accordance with an embodiment, a development interface (e.g., a development canvas) 310 in the web UI application can be used by a user 320 to create an ICS integration flow, using a plurality of existing connections 301, for example, connection A 303, connection B 305 and connection N 307.

As shown in FIG. 3, a particular connection (for example, connection A) can be dragged and dropped 311 to the development interface as a source connection 313, and connection N can be dragged and dropped 309 to the development interface as a target connection 315. The source connection can include information required to connect to a source application, and can be used by the ICS to receive requests from the source application. The target connection can include information required to connect to a target application (for example, a Salesforce cloud application), and can be used by the ICS to send requests to the target application.

In accordance with an embodiment, the source and target connections can be further configured to include additional information. For example, the additional information can include types of operations to be performed on data associated with a request, and objects and fields against those operations.

In accordance with an embodiment, once the source and target connections are configured, mappers between the two connections can be enabled, and mapper icons (for example, mapper icon A 317 and mapper icon B 318) can be displayed for use in opening the mappers, so that the user can define how information is transferred between a source and target data objects for both the request and response messages.

In accordance with an embodiment, the mappers can provide a graphical user interface for the user to map items (for example, fields, attributes, and elements) between the source and target applications by dragging a source item onto a target item. When a mapper for a request or response message in an ICS integration flow is opened, the source and target data objects can be automatically loaded using the source and target connections.

In accordance with an embodiment, lookups can be provided to facilitate the creation of mappings. As used herein, lookups are reusable mappings for different codes and terms used in applications to describe the same item. For example, one application uses a specific set of codes to describe countries, while another application uses a different set of codes to describe the same countries. Lookups can be used to map these different codes across the different applications.

As described above, development of an integration flow can be a complex effort requiring various components to be defined before the integration flow can be successfully deployed and executed. Some components within an integration flow are required to be defined while others are optional. Further complicating the development process is that defining optional components may lead to additional required components, and that the required components at any point in time during the development effort may vary, depending upon the order in which the integration components were defined.

Figure 4:
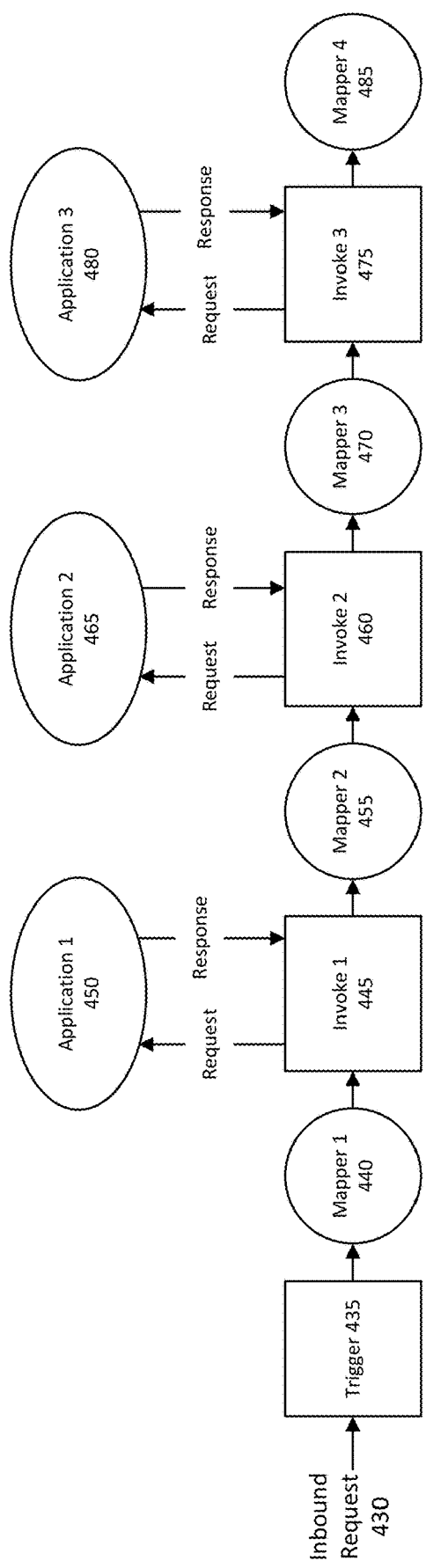
FIG. 4 shows an orchestration integration flow of applications, in accordance with an embodiment.

FIG. 4 shows an orchestration integration flow of applications, in accordance with an embodiment.

In accordance with an embodiment, an orchestration integration flow (i.e., orchestration of applications) can comprise a plurality of application adapters, such as invoke 1 445, invoke 2 460, and invoke 3 475. The orchestration integration flow can additionally comprise a number of mappers, such as mapper 1 440, mapper 2 455, mapper 3 470, and mapper 4 485, which each can map different sets of data, depending upon, e.g., the requirements of the application adapters.

In accordance with an embodiment, each application adapter (i.e., each invoke) can be associated with an external application (or an instance of an external application), such as application 1 450, application 2 465, and application 3 480.

In accordance with an embodiment, the invoke actions can vary between and within adapters. For example, some invoke actions can deploy and persist changes to target applications, while other invoke actions do not change target applications (e.g., "read-only" actions).

In accordance with an embodiment, an inbound request 430 can trigger 435 the orchestration integration flow to run or tested.

Identification and Execution of Activities in Parallel in an Integration Flow

In accordance with an embodiment, an integration of applications consists of multiple applications working together in an orchestration. Generally, the integration platform provides ways to interact with these applications with the help of client applications. These client applications are called connectors or adapters.

In accordance with an embodiment, during runtime of the integration flow instance, a message (also referred to as a payload) goes through the flow and can be transformed for specific application endpoints. Generally, the internal format of the message going through transformations is XML (Extensible Markup Language). XSLT (Extensible Stylesheet Language Transformations) is a standard way of transforming an XML payload (source) into another XML payload (target). In the integration flow, the integration designer can add these transformers (also referred to as "mapper" or "mappers") at various points in the orchestration logic.

In accordance with an embodiment, at each instance of the mapper, an XSLT document can be generated. This document has XPath (a query language for selecting nodes of an XML document, such as the payload) of the source elements from which values need to be picked and assigned to target elements.

In accordance with an embodiment, depending upon the number of mappers in a flow, the generated artifacts of the integration flow will have many XSLTs, one for each mapper In accordance with an embodiment, the presently disclosed systems and methods address the problem of executing independent I/O based activities in an integration orchestration serially and not making use of the parallel processing capabilities offered by underlying technology stack.

In accordance with an embodiment, in an orchestration-based integration flow, there can be many activities which can be performed in parallel (asynchronously) to the main thread. Currently, these activities (e.g., invokes) can only be executed sequentially. In an integration platform, such as iPaaS, generally these activities spend most of the time in I/O (e.g. uploading a file, downloading a file, interacting with a remote application endpoint which might be slow, . . . . etc.).

In accordance with an embodiment, if these activities are executed in parallel/asynchronously (from the main thread) then independent I/O activities can run in parallel and can improve runtime performance considerably.

In accordance with an embodiment, however, in order to allow for parallel execution of tasks/activities within an integration, certain conditions can be met. All pre conditions need to be considered and completed before a downstream activity can be executed in parallel. Such conditions can take into consideration the type of input to the downstream activity, and whether a same target endpoint is used in another activity prior to the downstream activity.

In accordance with an embodiment, there are, in general, two main types of inputs: Literal/values which will not change i.e., read only data; and reference variables which refer to an object (e.g. virtual file system (VFS) reference refers to a file in filesystem or object store)

In accordance with an embodiment, if the same target endpoint is used in any prior activity then the point of interest should be definitely after this prior activity as there could be a change in the state of the target application. The systems and methods are designed to achieve parallel processing of invokes without disrupting sequential processing for the same target endpoint.

In accordance with an embodiment, if source elements used as input to the downstream activity are not used in any activity before, then the point of parallel processing can be determined easily by just finding the place where all input elements are ready.

Figure 5:
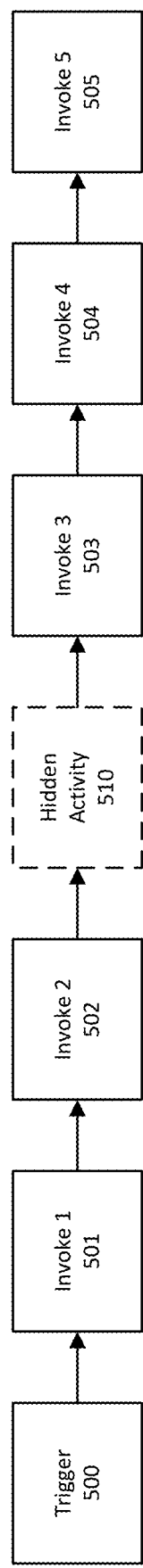
FIG. 5 shows an example integration flow, in accordance with an embodiment.

FIG. 5 shows an example integration flow, in accordance with an embodiment.

In accordance with an embodiment, in the depicted example, response elements from upstream invoke activities are used directly in the downstream activity of interest.

In accordance with an embodiment, in the depicted embodiment, the integration comprises an orchestration of a Trigger 400 (which can start the integration), Invoke 1 501, Invoke 2 502, Invoke 3 503, Invoke 4 504, and Invoke 5 505. Each invoke can comprise, for example, a connection that connects to an external instance of an application, and each invoke can, for example, send and receive packets to/from its linked instance of an external application.

In accordance with an embodiment, invoke 5 can be executed in parallel if the input needed by this invoke is provided by upstream invoke(s). In the depicted embodiment, suppose that the input required for invoke 5 is provided by invokes 1 and 2, while invoke 3 and 4 do not provide any of the input required by invoke 5. In such a situation, then, the point of parallel execution would be just after invoke 2, as this is the point in the orchestration flow where all the input needed by invoke 5 is ready. Note that here response of invoke 1 and invoke 2 are assumed to not be used anywhere else in the integration flow prior to invoke 5.

In accordance with an embodiment, at design time, the point of parallel execution for invoke 5 can be inferred from the orchestration flow and a hidden activity 510 can be inserted after invoke 2. This hidden activity can comprise, for example, instructions to an integration flow agent responsible for executing the integration flow to run invoke 5 in parallel/asynchronously to the overall integration after invoke 2 has finished executing. The insertion of the hidden activity can is described in, for example, U.S. Pat. No. 10,585,678, entitled "INSERTION OF CUSTOM ACTIVITIES IN AN ORCHESTRATED APPLICATION SUITE", issued on Mar. 10, 2020, which is incorporated by reference in its entirety.

In accordance with an embodiment, FIG. 5 shows the updated execution flow with the hidden activity 510 inserted into the integration flow.

In accordance with an embodiment, if the input elements are used prior to the activity (in question) and use same target endpoint as the downstream activity, then the systems and methods need to find the point after its last usage with same target endpoint before activity (in question).

In accordance with an embodiment, for example, suppose that response elements from upstream invoke activities are used elsewhere before such elements are used in the downstream activity of interest.

In accordance with an embodiment, suppose that there exists an integration with orchestration [Trigger]→[invoke1]→[invoke2]→[invoke3]→[invoke4]→[invoke5] - - -

In accordance with an embodiment, invoke5 is dependent on response of invoke1 and invoke2, but response from these upstream invoke activities are also used by invoke3, and invoke3 interacts with same target endpoint as invoke5. In this case, point of parallel execution would be just after invoke3, as this is the point in the orchestration flow where all the input needed by invoke5 is ready, and no other invoke interacts with the target endpoint of invoke5 (that is, invoke 4 does not have the same target endpoint of invoke5). Note that here responses of invoke1 and invoke2 are used in invoke3 which is before invoke5. In this case invoke4 will run in parallel with invoke5.

In accordance with an embodiment, if invoke4 and invoke5 were interacting with different target endpoints, then invoke4 can run in parallel with invoke5.

In accordance with an embodiment, at design time, the information needed to determine if an invoke can run in parallel/asynchronously, and the insertion point for the hidden activity, can be inferred from the orchestration flow and a hidden activity can be inserted after invoke3.

In accordance with an embodiment, the updated orchestration flow would be [Trigger]→[invoke1]→[invoke2]→[invoke3]-{hidden_activity}→[invoke4]→[invoke5] - - -

In accordance with an embodiment, in order to determine points of parallel execution in an integration flow, the systems and methods can determine this information for all inputs for each invoke. In this case, the orchestration before the downstream invoke in interest is considered and not complete orchestration of the flow. The place where all inputs are ready (end of usage scope for each input and the furthest usage scope is considered) is the place where a hidden activity can be inserted. This hidden activity is responsible for running the downstream invoke in parallel.

In accordance with an embodiment, once the parallel processing point is identified for an invoke activity, a hidden activity is added to this point in the flow which encapsulates information about the activity to be executed in parallel. At runtime, based on additional properties, once control reaches to the hidden activity, the downstream activity can be invoked in parallel. Integration runtime can make the best effort to execute these invokes in parallel and if additional threads are not available it can resort to serial approach for few flow instances.

In accordance with an embodiment, at design time, points for inserting hidden activities can be figured by scanning XSLs generated for various mappings. For any activity the input is known from XSL for that activity. A scan can be performed from starting of the flow to this downstream activity to find the place where this activity can be invoked in parallel.

In accordance with an embodiment, during the design of an integration (i.e., at design time), the above approach is applied to insert hidden activities for all invoke activities in the flow. User interface of integration platform can show which invokes can be executed in parallel through some UI indicators. Orchestration UI can also let one to opt-in/opt-out of this feature for one or all invokes. If a designer opts out for an invoke then the hidden activity inserted for this invoke can be either removed from flow, or it's configuration can be changed to have no effect at runtime.

In accordance with an embodiment, at runtime, when control reaches to an activity being executed in parallel, then the main thread can wait if the parallel thread is not complete. Main thread can check for the completion status of the thread by checking for a completion state in a data structure. Main thread will block if the parallel thread is executing by the time control reaches to an activity running in parallel. Also, if there is any error in the main thread then all parallel threads should be stopped. This is because the flow will not run anyway. This synchronization of threads can be performed using any thread synchronization techniques available today.

In accordance with an embodiment, the systems and methods described herein can provide for improved runtime performance. Independent I/O activities can be performed in parallel. In addition, no explicit modelling needed. Identification of the points to inject hidden activity is performed at design time and this point may change automatically if the integration orchestration changes.

Figure 6:
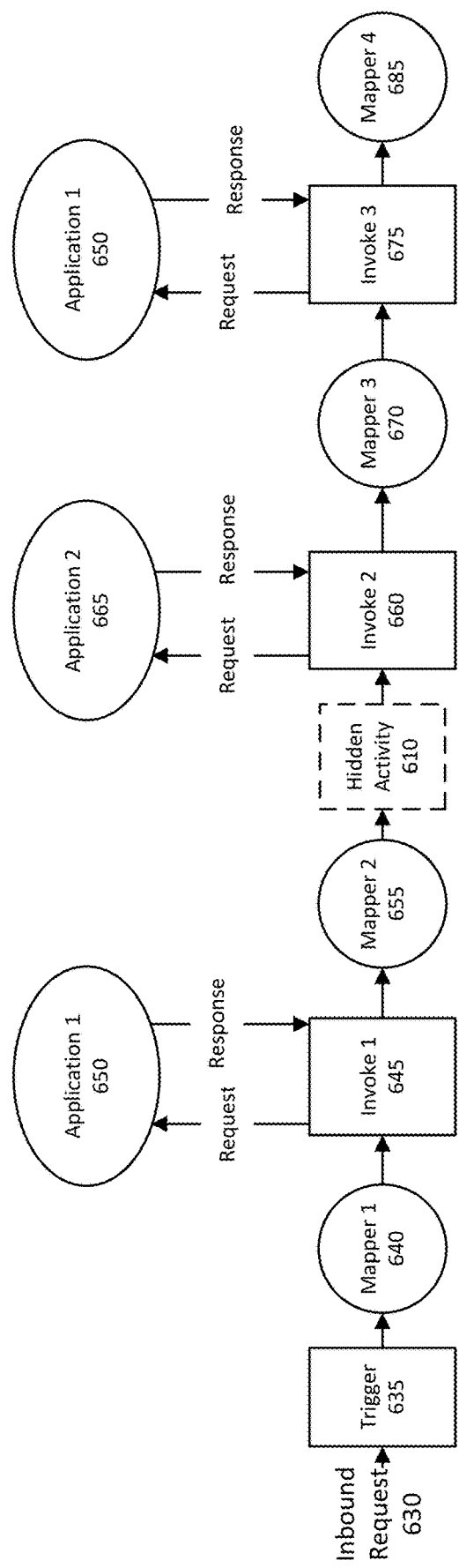
FIG. 6 shows an example integration flow, in accordance with an embodiment.

FIG. 6 shows an example integration flow, in accordance with an embodiment.

In accordance with an embodiment, an orchestration integration flow (i.e., orchestration of applications) can comprise a plurality of application adapters, such as invoke 1 645, invoke 2 660, and invoke 3 675. The orchestration integration flow can additionally comprise a number of mappers, such as mapper 1 640, mapper 2 655, mapper 3 670, and mapper 4 685, which each can map different sets of data, depending upon, e.g., the requirements of the application adapters.

In accordance with an embodiment, each application adapter (i.e., each invoke) can be associated with an external application (or an instance of an external application), such as application 1 650, application 2 665, and application 3 680.

In accordance with an embodiment, the invoke actions can vary between and within adapters. For example, some invoke actions can deploy and persist changes to target applications, while other invoke actions do not change target applications (e.g., "read-only" actions).

In accordance with an embodiment, an inbound request 630 can trigger 635 the orchestration integration flow to run or tested.

In accordance with an embodiment, for example, during design of the integration flow/orchestration, the system can determine that, for example, invoke 3 can be run in parallel with the overall integration flow after invoke 1 has executed.

In this case, invoke 3 can, for example, have inputs from a response from Application 1 to invoke 1. In addition, invoke 2 does not have any bearing on invoke 3, as it can use different inputs, have different responses, which invoke 3 does not rely upon. In this case, then, a hidden activity 610 can be inserted (e.g., either automatically, by user design, or by user input based on a suggestion provided) that would allow invoke 3 to run in parallel/asynchronously with the main flow, which in this case means having invoke 3 and invoke 2 execute in parallel.

Figure 7:
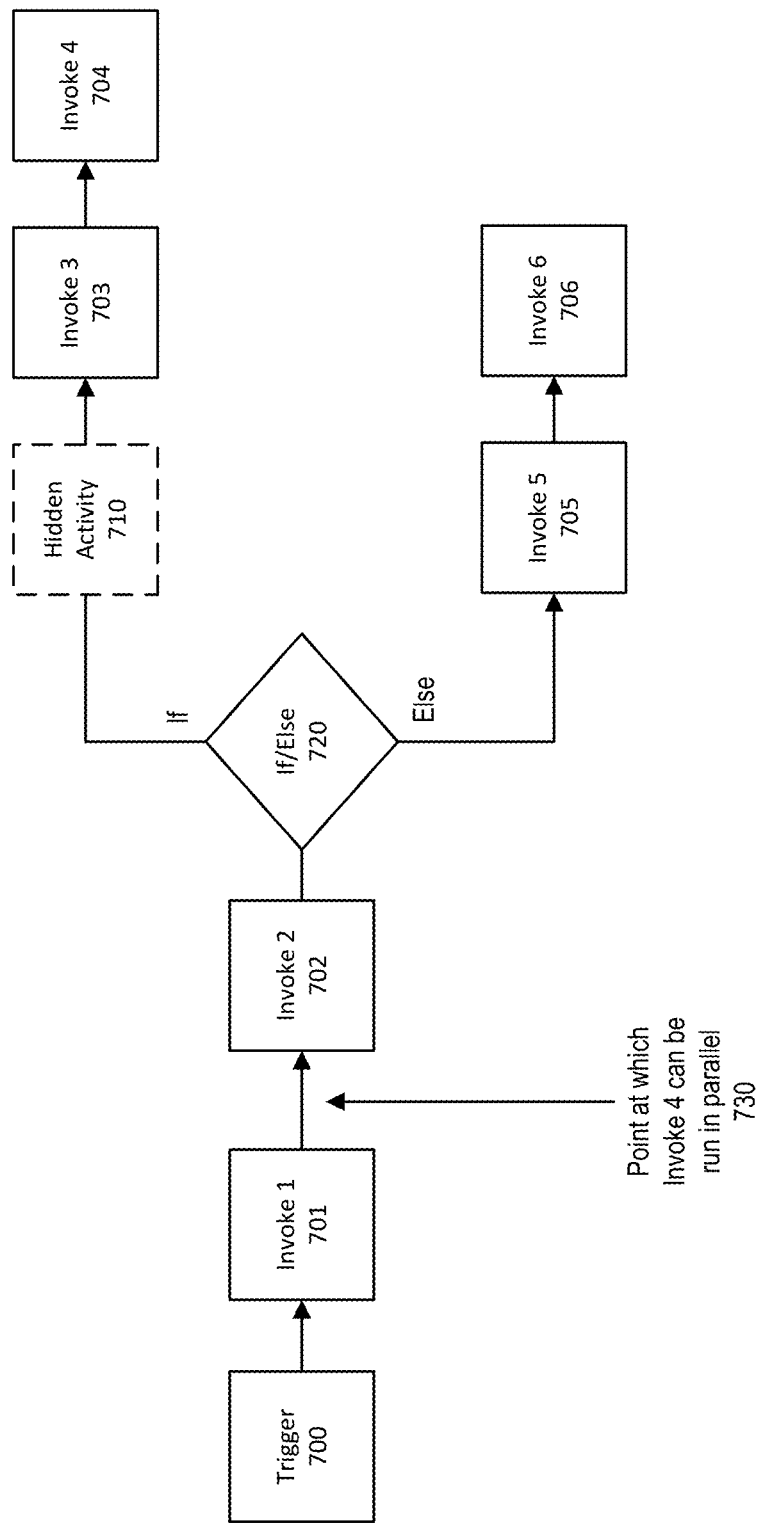
FIG. 7 shows an example integration flow, in accordance with an embodiment.

FIG. 7 shows an example integration flow, in accordance with an embodiment.

In accordance with an embodiment, FIG. 7 shows an embodiment of the present disclosure in the event of a non-linear integration flow. FIG. 7 depicts a forked integration orchestration where the primary integration series is split by an "if/else" statement 720. In this depicted embodiment, the integration flow can comprise trigger 700, invoke 1 701, invoke 2 702, an if/else statement 720, invoke 3 703, invoke 4 704, invoke 5 705, and invoke 6 706.

In accordance with an embodiment, if an activity to be executed in parallel happens to be part of "if" or "else" branch, and if the point of parallel execution 730 is determined before the branch, then the hidden activity (710) for this downstream activity will be added at the start of the branch where this activity is added. This way, at runtime, the downstream activity will be executed as soon as its branch is selected.

For example, if it is determined that invoke 4 704 has all conditions met to execute in parallel with the main flow after the execution of invoke 1, then the hidden activity 710 will be inserted on the "if" branch of the flow shown in FIG. 7.

Figure 8:
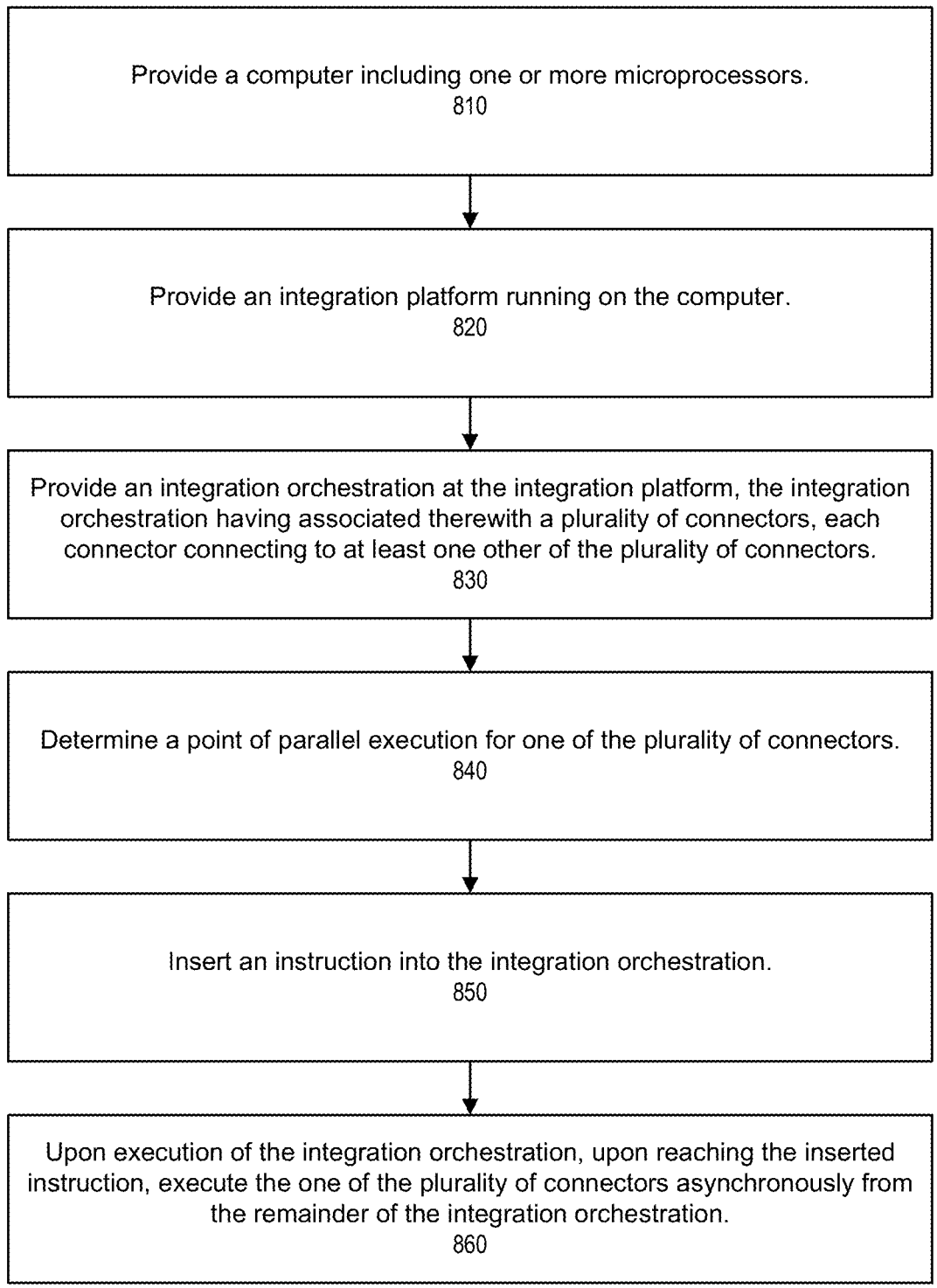
FIG. 8 is a flowchart of a method for parallel execution of activities in an integration flow, in accordance with an embodiment.

FIG. 8 is a flowchart of a method for parallel execution of activities in an integration flow, in accordance with an embodiment.

In accordance with an embodiment, at step 810, the method can provide a computer including one or more microprocessors.

In accordance with an embodiment, at step 820, the method can provide an integration platform running on the computer.

In accordance with an embodiment, at step 830, the method can provide an integration orchestration at the integration platform, the integration orchestration having associated therewith a plurality of connectors, each connector connecting to at least one other of the plurality of connectors.

In accordance with an embodiment, at step 840, the method can determine a point of parallel execution for one of the plurality of connectors.

In accordance with an embodiment, at step 850, the method can insert an instruction into the integration orchestration.

In accordance with an embodiment, at step 860, the method can, upon execution of the integration orchestration, upon reaching the inserted instruction, execute the one of the plurality of connectors asynchronously from the remainder of the integration orchestration.

In accordance with an embodiment, while the above method is described in the context of one activity being executed in parallel/asynchronously, one of ordinary skill in the art would readily understand that such a method can be executed for one or many of a plurality of connectors in an integration flow. That is, when multiple connectors are determined to be able to be executed in parallel/asynchronously, then the method can be applied to each of the connectors such that a plurality of connectors are executed in parallel with/asynchronously to the main integration flow. In such situations, the method can be executed for each such connector/activity such that each connector/activity can have an associated hidden activity/instruction inserted into the integration flow that triggers such parallel execution.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for parallel execution of activities in an integration flow, comprising:
   a computer including one or more microprocessors;
   an integration platform running on the computer; and
   an integration orchestration at the integration platform, the integration orchestration having associated therewith a plurality of connectors, each connector connecting to at least one other of the plurality of connectors;
   wherein a point of parallel execution is determined for one of the plurality of connectors;
   wherein an instruction is inserted into the integration orchestration;
   wherein upon execution of the integration orchestration, upon reaching the inserted instruction, the one of the plurality of connectors is executed asynchronously from the remainder of the integration orchestration.

2. The system of claim 1,
   wherein the integration orchestration comprises a linear flow of the plurality of connectors; and
   wherein the instruction is inserted at the determined point of parallel execution.

3. The system of claim 1,
   wherein another point of parallel execution is determined for another one of the plurality of connectors;
   wherein another instruction is inserted into the integration orchestration;
   wherein upon execution of the integration orchestration, upon reaching the inserted another instruction, the another one of the plurality of connectors is executed asynchronously from the remainder of the integration orchestration.

4. The system of claim 1,
   wherein determining the point of parallel execution comprises:
      during design of the integration orchestration, determining a point at which all inputs to the one of the plurality of connectors are static, wherein the point is prior to the one of the plurality of connectors.

5. The system of claim 4,
   wherein determining the point of parallel execution further comprises:
      during the design of the integration orchestration, determine a second point at which all other of the plurality of connectors do not interact with a same external application instance as the one of the plurality of connectors, wherein the second point is prior to the one of the plurality of connectors.

6. The system of claim 5,
   wherein determining the point of parallel execution comprises:
      selecting the point of parallel execution as the later, within the integration orchestration, of the point at which inputs to the one of the plurality of connectors are static and the second point at which all other of the plurality of connectors do not interact with the same external application instance as the one of the plurality of connectors.

7. The system of claim 1,
   wherein the integration orchestration comprises an if/else statement, wherein after the if/else statement, the integration orchestration comprises at least two branches;
   wherein the one of the plurality of connectors is located on one of the at least two branches;
   wherein the instruction is inserted at the start of the one of at least two branches.

8. A method for parallel execution of activities in an integration flow, comprising:
   providing a computer including one or more microprocessors;
   providing an integration platform running on the computer; and
   providing an integration orchestration at the integration platform, the integration orchestration having associated therewith a plurality of connectors, each connector connecting to at least one other of the plurality of connectors;
   determining a point of parallel execution for one of the plurality of connectors;
   inserting an instruction into the integration orchestration;
   upon execution of the integration orchestration, upon reaching the inserted instruction, executing the one of the plurality of connectors asynchronously from the remainder of the integration orchestration.

9. The method of claim 8,
   wherein the integration orchestration comprises a linear flow of the plurality of connectors; and
   wherein the instruction is inserted at the determined point of parallel execution.

10. The method of claim 8,
wherein another point of parallel execution is determined for another one of the plurality of connectors;
wherein another instruction is inserted into the integration orchestration;
wherein upon execution of the integration orchestration, upon reaching the inserted another instruction, the another one of the plurality of connectors is executed asynchronously from the remainder of the integration orchestration.

11. The method of claim 8,
wherein the determining the point of parallel execution comprises:
during design of the integration orchestration, determining a point at which all inputs to the one of the plurality of connectors are static, wherein the point is prior to the one of the plurality of connectors.

12. The method of claim 11,
wherein the determining the point of parallel execution further comprises:
during the design of the integration orchestration, determine a second point at which all other of the plurality of connectors do not interact with a same external application instance as the one of the plurality of connectors, wherein the second point is prior to the one of the plurality of connectors.

13. The method of claim 12,
wherein the determining the point of parallel execution comprises:
selecting the point of parallel execution as the later, within the integration orchestration, of the point at which inputs to the one of the plurality of connectors are static and the second point at which all other of the plurality of connectors do not interact with the same external application instance as the one of the plurality of connectors.

14. The method of claim 8,
wherein the integration orchestration comprises an if/else statement, wherein after the if/else statement, the integration orchestration comprises at least two branches;
wherein the one of the plurality of connectors is located on one of the at least two branches;
wherein the instruction is inserted at the start of the one of at least two branches.

15. A non-transitory computer readable storage medium, having instructions for parallel execution of activities in an integration flow, which when read an executed cause a computer to perform steps comprising:
providing a computer including one or more microprocessors;
providing an integration platform running on the computer; and
providing an integration orchestration at the integration platform, the integration orchestration having associated therewith a plurality of connectors, each connector connecting to at least one other of the plurality of connectors;
determining a point of parallel execution for one of the plurality of connectors;
inserting an instruction into the integration orchestration;
upon execution of the integration orchestration, upon reaching the inserted instruction, executing the one of the plurality of connectors asynchronously from the remainder of the integration orchestration.

16. The non-transitory computer readable storage medium of claim 15,
wherein the integration orchestration comprises a linear flow of the plurality of connectors; and
wherein the instruction is inserted at the determined point of parallel execution.

17. The non-transitory computer readable storage medium of claim 15,
wherein another point of parallel execution is determined for another one of the plurality of connectors;
wherein another instruction is inserted into the integration orchestration;
wherein upon execution of the integration orchestration, upon reaching the inserted another instruction, the another one of the plurality of connectors is executed asynchronously from the remainder of the integration orchestration.

18. The non-transitory computer readable storage medium of claim 15,
wherein the determining the point of parallel execution comprises:
during design of the integration orchestration, determining a point at which all inputs to the one of the plurality of connectors are static, wherein the point is prior to the one of the plurality of connectors.

19. The non-transitory computer readable storage medium of claim 18,
wherein the determining the point of parallel execution further comprises:
during the design of the integration orchestration, determine a second point at which all other of the plurality of connectors do not interact with a same external application instance as the one of the plurality of connectors, wherein the second point is prior to the one of the plurality of connectors; and
selecting the point of parallel execution as the later, within the integration orchestration, of the point at which inputs to the one of the plurality of connectors are static and the second point at which all other of the plurality of connectors do not interact with the same external application instance as the one of the plurality of connectors.

20. The non-transitory computer readable storage medium of claim 15,
wherein the integration orchestration comprises an if/else statement, wherein after the if/else statement, the integration orchestration comprises at least two branches;
wherein the one of the plurality of connectors is located on one of the at least two branches;
wherein the instruction is inserted at the start of the one of at least two branches.

* * * * *

UNITED STATES PATENT AND TRADEMARK OFFICE
CERTIFICATE OF CORRECTION

PATENT NO. : 11,381,638 B1  
APPLICATION NO. : 17/180483  
DATED : July 5, 2022  
INVENTOR(S) : Prakash Kumar Devta Page 1 of 1

It is certified that error appears in the above-identified patent and that said Letters Patent is hereby corrected as shown below:

On the Title Page

Column 1, under item (54) Title, Line 2, delete "ACTIVITES" and insert -- ACTIVITIES --, therefor.

In the Drawings

On sheet 3 of 8, in Figure 3, under Reference Numeral 307, Line 3, delete "Saleforce" and insert -- Salesforce --, therefor.

In the Specification

In Column 1, Line 2, delete "ACTIVITES" and insert -- ACTIVITIES --, therefor.

In Column 5, Line 64, delete "mapper" and insert -- mapper. --, therefor.

In Column 6, Line 28, delete "store)" and insert -- store). --, therefor.

In Column 10, Line 25, delete "Technology:" and insert -- Technology): --, therefor.

Signed and Sealed this  
Twenty-seventh Day of December, 2022

Katherine Kelly Vidal  
*Director of the United States Patent and Trademark Office*